(12) United States Patent
Coyes et al.

(10) Patent No.: US 7,069,997 B2
(45) Date of Patent: Jul. 4, 2006

(54) VALVE CAGE INSERT

(76) Inventors: Corbin Coyes, 4671 Quentin Street S.W., Calgary, Alberta (CA) T2T 6J1; Ben Rowlandson, Bay 16, 2280-39 Avenue N.E., Calgary, Alberta (CA) T2E 6P7

( * ) Notice: Subject to any disclaimer, the term of this patent is extended or adjusted under 35 U.S.C. 154(b) by 0 days.

(21) Appl. No.: 10/624,235

(22) Filed: Jul. 21, 2003

(65) Prior Publication Data

US 2005/0257927 A1    Nov. 24, 2005

Related U.S. Application Data

(60) Provisional application No. 60/397,015, filed on Jul. 22, 2002.

(51) Int. Cl.
    *E21B 34/06*    (2006.01)

(52) U.S. Cl. .................. 166/328; 166/325; 137/533.11
(58) Field of Classification Search ................ 166/105, 166/108, 327, 328, 325; 417/554; 137/533.11
See application file for complete search history.

(56) References Cited

U.S. PATENT DOCUMENTS

| 735,248 | A | * | 8/1903 | Hahn ..................... 137/533.13 |
| 1,555,068 | A | * | 9/1925 | Nixon ........................ 137/331 |
| 5,117,861 | A | | 6/1992 | McConnell et al. |
| 5,593,292 | A | | 1/1997 | Ivey |
| 6,199,636 | B1 | * | 3/2001 | Harrison ..................... 166/328 |
| 6,283,148 | B1 | * | 9/2001 | Spears et al. .......... 137/533.11 |

* cited by examiner

*Primary Examiner*—Jennifer H. Gay
*Assistant Examiner*—Giovanna M. Collins
(74) *Attorney, Agent, or Firm*—Sheridan Ross P.C.

(57) ABSTRACT

The insert for a ball and seat valve comprises a tubular cylindrical body formed by vertically spaced apart top and bottom rings joined by helically inclined and circumferentially spaced apart ribs defining side openings. The ribs support inwardly arching ball guide flanges which thin in cross-section as they extend inwardly and upwardly from the ribs. The inner upper ends of the flanges are connected with and tied together by an elongate, upwardly extending reinforcing member protruding above the top ring. The reinforcement member provides structural strength to the thinned flanges. Thinning of the flanges leads to increasing the open area of the top outlets, thereby promoting the volumetric fluid capacity of the valve.

8 Claims, 5 Drawing Sheets

VALVE CAGE INSERT

CROSS REFERENCE TO RELATED APPLICATIONS

This application claims the benefit of U.S. Provisional Patent Application Ser. No. 60/397,015, filed Jul. 22, 2002 entitled "VALVE CAGE INSERT" the entire disclosure of which is incorporated herein by reference.

BACKGROUND OF THE INVENTION

Reciprocating, sucker rod-driven, downhole pumps are commonly used in wells to raise produced fluid to ground surface from a subsurface formation.

This type of pump usually incorporates a pair of ball and seat valves in its plunger. These valves are referred to as the standing and travelling valves.

In general, these valves comprise:
- a vertically oriented, cylindrical, tubular cage forming a through-bore and having internal ball guide flanges;
- a horizontal annular seat extending across the bore at its lower end——the seat is supported by the cage;
- a ball positioned within the cage bore; and
- a transverse ball stop extending across the upper end of the bore and connected with the cage wall;

whereby the ball can seat on the seat to close the bore or may be unseated by pressure from below to permit fluid to pass upwardly a round the ball and between the guide flanges. The fluid exits through top outlets formed between the ball stop crossbars and the cage side wall.

There have been many features incorporated into this basic combination over the years, to achieve various objectives. Three such objectives are improving durability, volumetric flow and pressure drop characteristics.

In connection with improving durability, it is known to provide the 'cage' in the form of an external, tubular, cylindrical 'shell' and an internal, slidingly received 'insert'. The insert is formed of hard alloy. A typical prior art shell/insert assembly is shown in FIG. 1.

More particularly, the shell/insert assembly comprises:
- An external steel shell, which has an internal stop shoulder for locking in the insert at the upper end and which supports and contains separate annular seat and sealed spacer members at its lower end; and
- An insert which comprises horizontal top and bottom rings joined by vertical, circumferentially spaced apart ribs forming side openings or "windows" between them. The ribs support inwardly projecting ball guide flanges arching inwardly to form a semi-spherical ball stop for retaining the valve ball. The side openings provide passageways for fluid flow around the ball. The flanges and top ring further form top outlets for egress of the fluid from the upper end of the inset.

The present invention is concerned with providing a modified insert which is designed with a view to improving volumetric flow. In addition, in a preferred embodiment the invention also seeks to incorporate desirable flow pattern and pressure drop characteristics.

SUMMARY OF THE INVENTION

In accordance with one aspect of the invention, an insert is provided in which the ball guide flanges thin in cross-section as they extend inwardly and upwardly from the ribs. In addition, the inner upper ends of the flanges are connected with and tied together by an elongate, upwardly extending reinforcing member protruding above the top ring. This combination has the following attributes:
- thinning of the flanges leads to increasing the open area of the top outlets, thereby promoting the volumetric fluid capacity of the valve; and
- the reinforcement member provides structural strength to reinforce the thinned flanges so as to better resist the upward impacts delivered by the ball.

In a preferred embodiment, the ribs are arranged to define helically directed side openings and the flanges are also helically configured. As a result, the incoming fluid is induced to adopt a helical flow pattern as it moves through the insert, thereby creating a centrifugal effect.

The insert will now be described in accordance with one preferred exemplification of the invention.

DESCRIPTION OF THE PREFERRED EMBODIMENT

Figure 1:
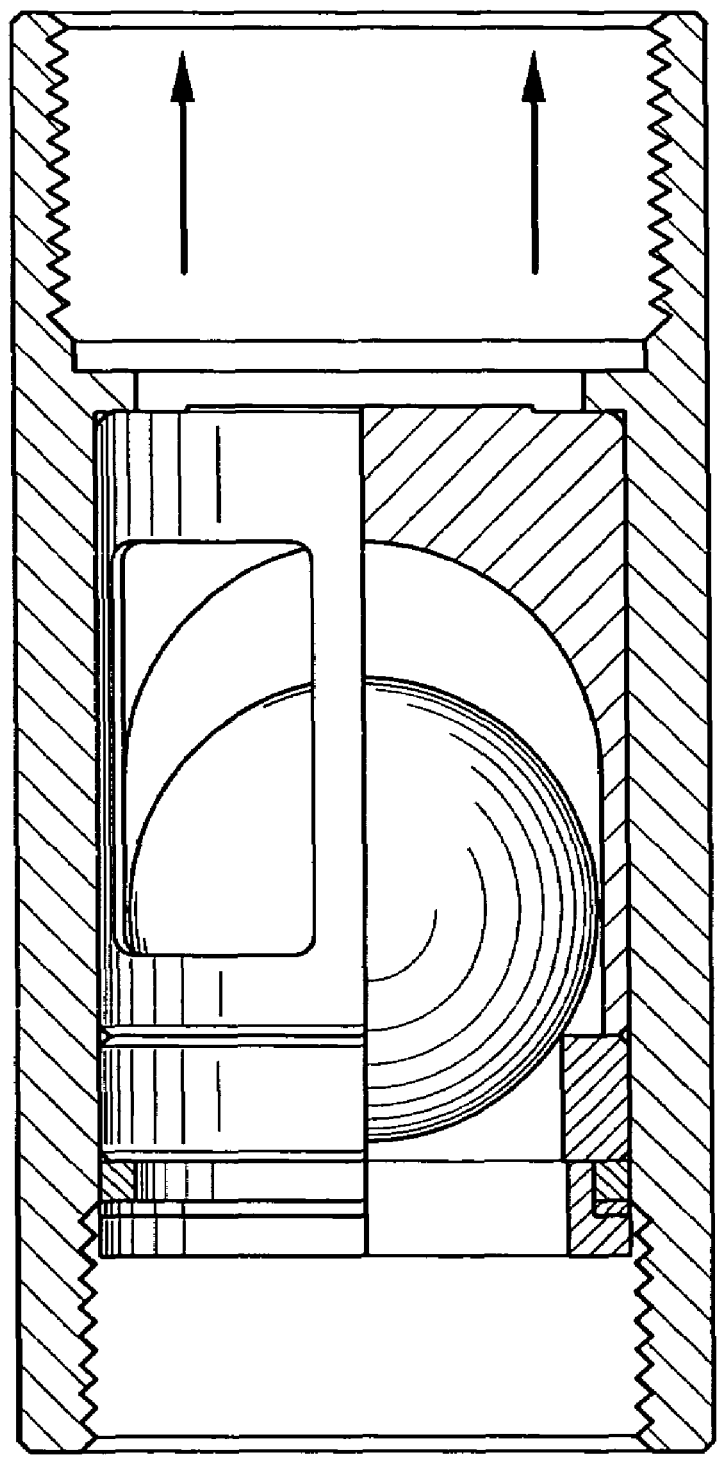
FIG. 1 is a sectional side view showing a shell/insert assembly in accordance with the prior art—the insert is shown positioned in the shell with a ball in the insert bore—the insert is retained in place by a seat and spacer.
Figure 2:
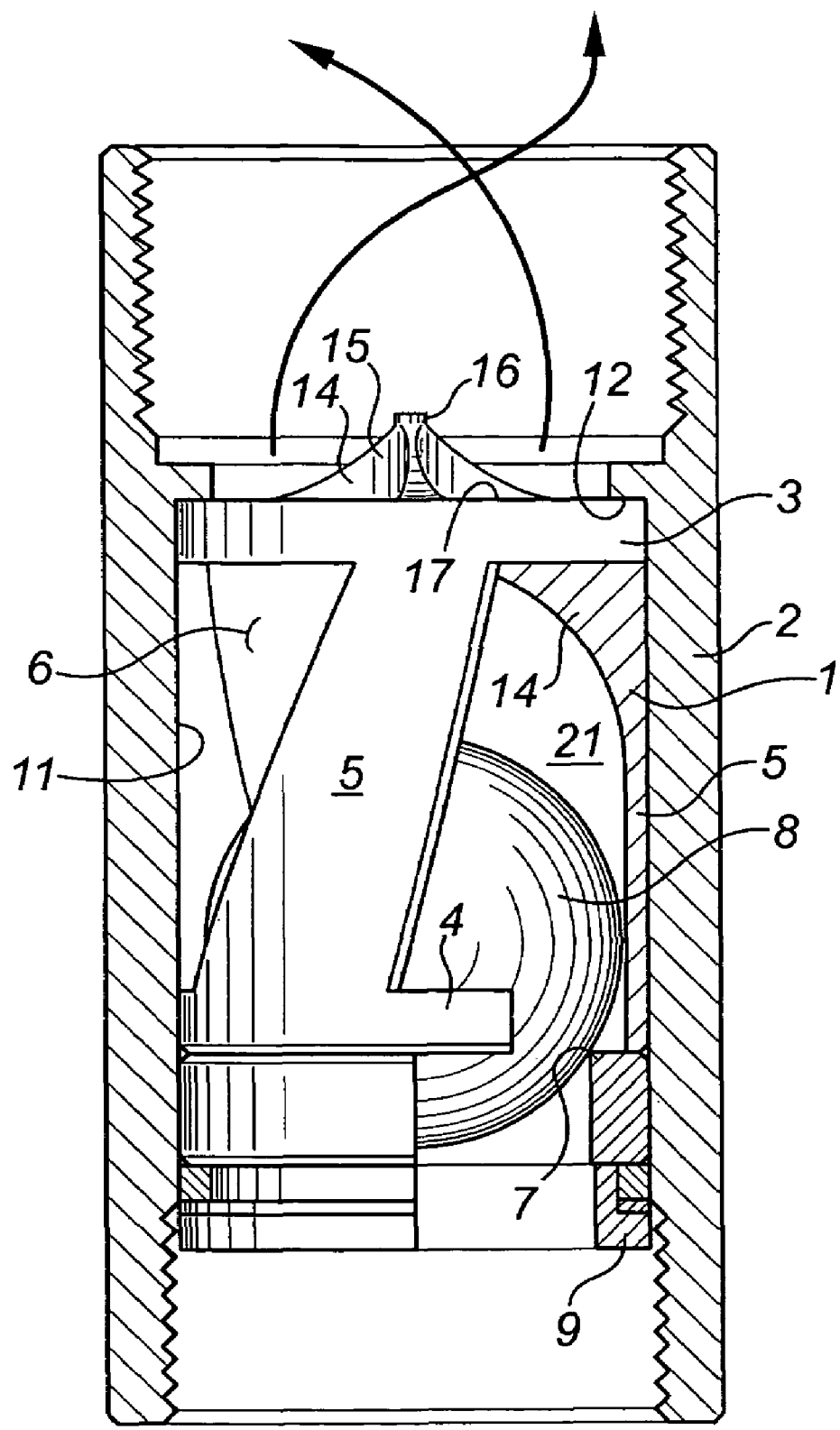
FIG. 2 is a partially sectional side view showing a shell/insert assembly in accordance with the present invention.
Figure 3:
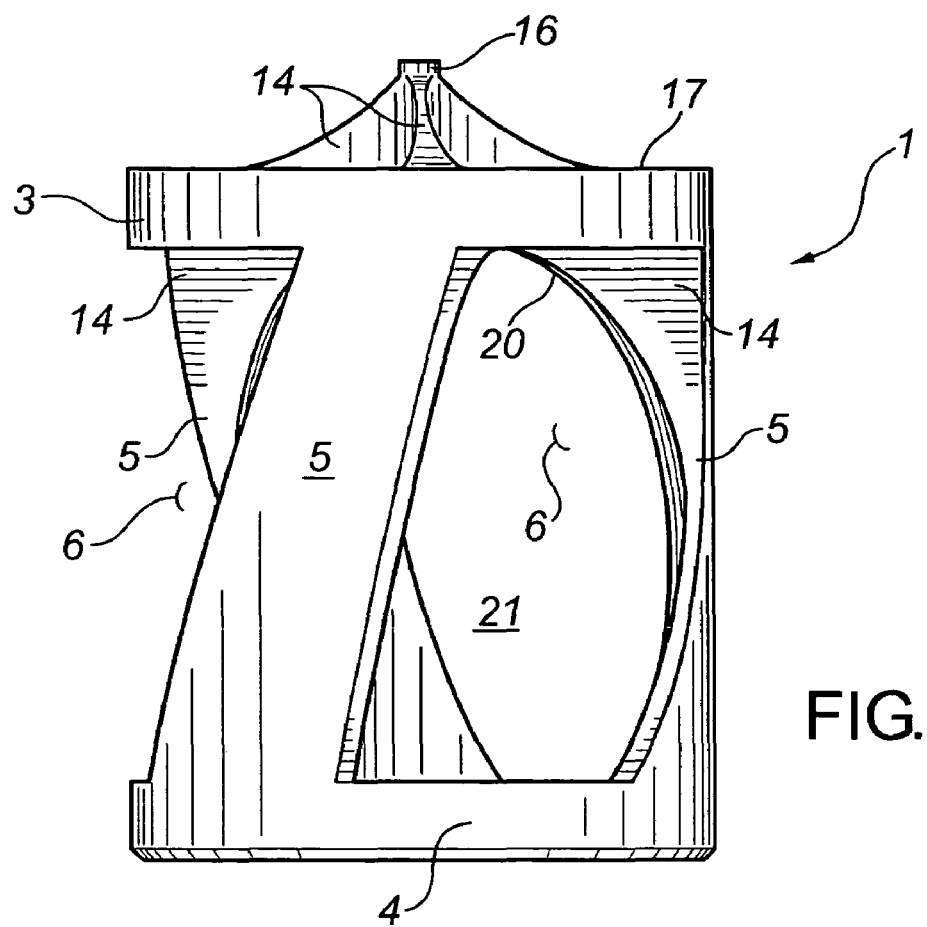
FIG. 3 is a side view of the insert of FIG. 2.
Figure 4:
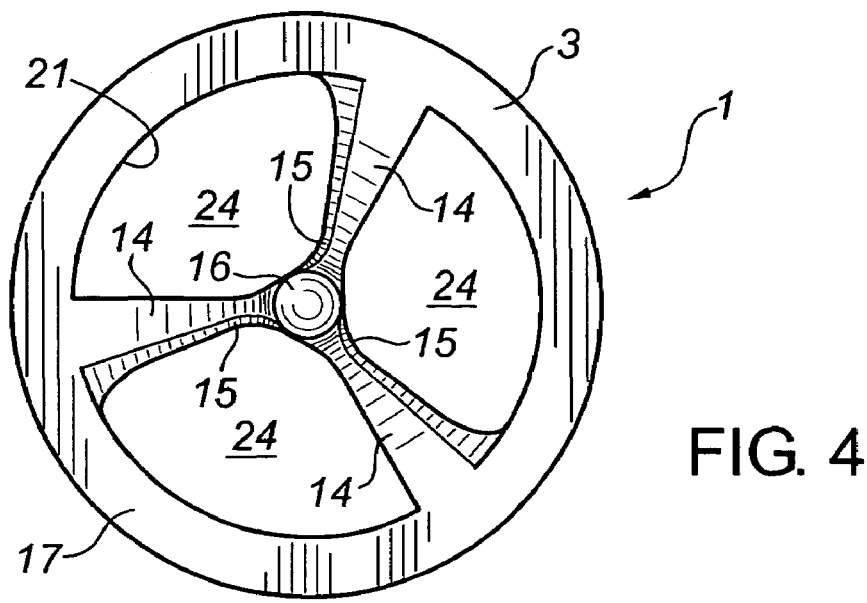
FIG. 4 is a top view of the insert.
Figure 5:
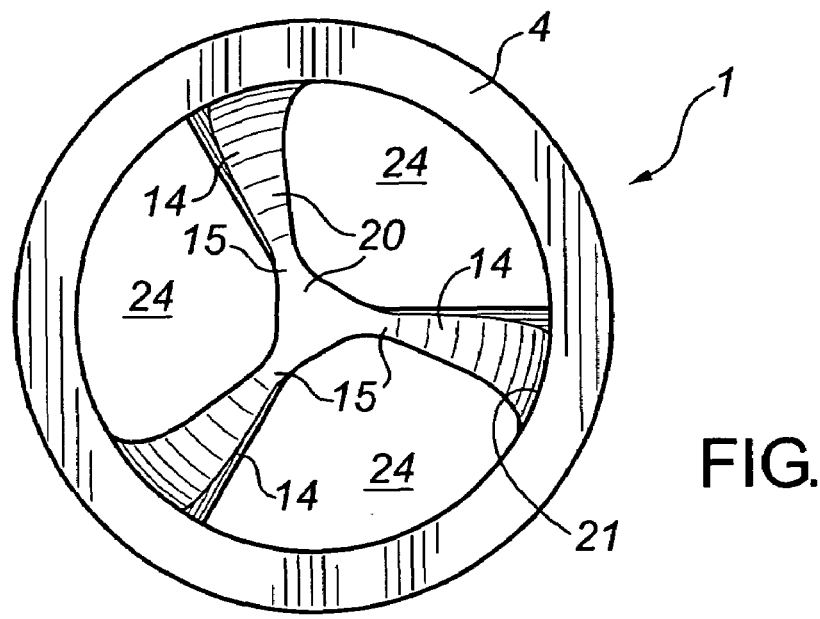
FIG. 5 is a bottom view of the insert.

Having reference to FIG. 2, the insert 1 is a tubular, cylindrical body adapted for use in the shell 2 of an insert-type ball and seat valve.

The insert 1 comprises horizontal, vertically spaced apart top and bottom rings 3,4. The rings are connected together by circumferentially spaced apart ribs 5. The ribs 5 and rings 3,4 combine to form side openings 6.

The shell 2 supports an inwardly protruding, annular seat 7, against which the valve ball 8 seats and seals. A bottom spacer 9 supports and locks the bottom end of the seat 7 in place in the bore 11 of the shell 2. A shoulder 12 of the shell 2 locks the insert body 1 in place at its upper end.

The ribs 5 are inclined and shaped so that side openings 6 are helically configured.

Figure 6:
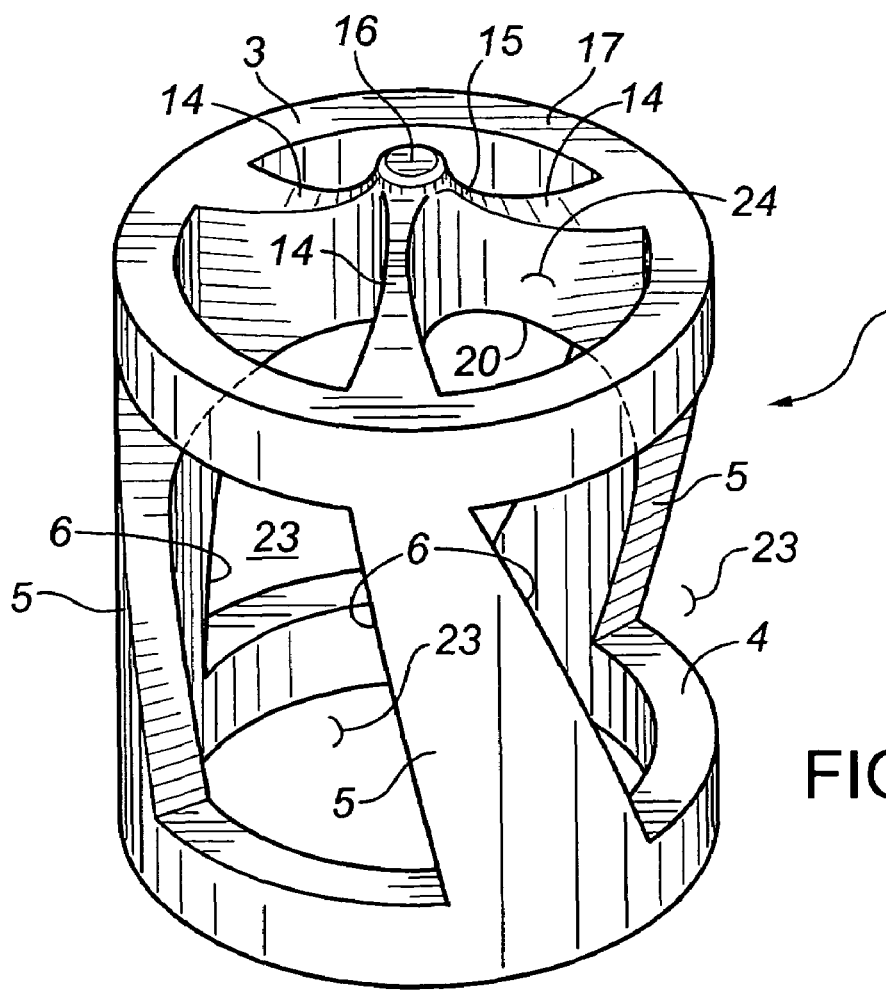
FIG. 6 is a perspective view of the insert.
Figure 8:
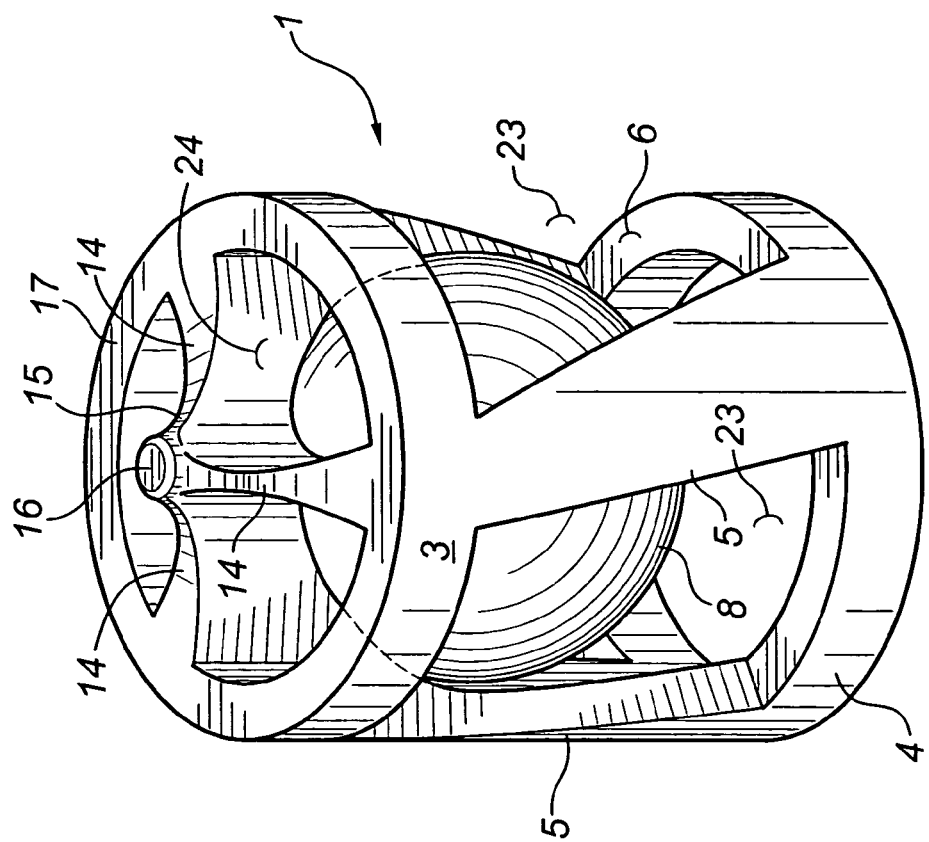
FIG. 8 is a perspective view similar to FIG. 7, showing the ball in contact with the stop.
Figure 7:
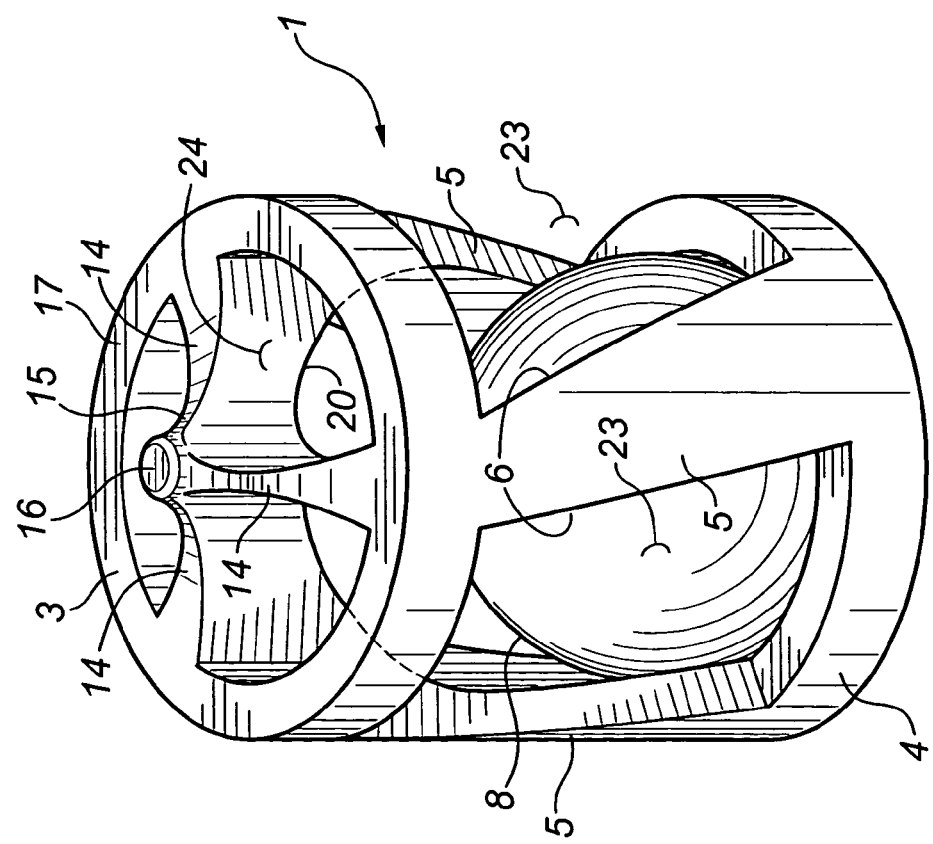
FIG. 7 is a perspective view of the insert with an unseated ball in place.

As best shown in FIG. 6, the ribs 5 support integral, inwardly extending, helically directed flanges 14. The flanges 14 are each shown as thinning along their length. They arch inwardly and come together at the insert's longitudinal axis. The flanges 14 and top ring 3 combine to form top outlets 24. The upper inner ends 15 of the flanges 14 are integral with and connected to an upwardly directed, elongate, rod-like reinforcing member 16. As shown in FIGS. 2 and 7, the reinforcing member 16 has a length greater than the vertical thicknesses of the flanges' upper inner ends 15 and protrudes above the upper rim 17 of the top ring 3.

The bottom surfaces 18, 19 of the flanges 14 and reinforcing member 16 are formed so as to provide a smooth semi-spherical stop surface 20 for engaging and restraining upward movement of the ball 8. The stop surface 20 is located beneath the upper edge of the top ring 3.

The insert, in use, is positioned in the bore 11 of the shell 2. A valve ball 8 is provided within the insert bore 21. The valve ball 8 can seat on the annular seat 7 to close the insert bore 21, or it can be displaced upwardly by fluid pressure from below. When the ball 8 is unseated, fluid flows upwardly through the channels 22 between the flanges 14 and outwardly around the ball 8 by moving through the passageways 23 provided by the side openings 6. As it moves upwardly in this fashion, the fluid is caused to swirl as it follows the helically oriented flow paths. The fluid exits through the top outlets 24.

Although a preferred embodiment has been shown and described, it will be appreciated by those skilled in the art that various changes and modifications may be made without departing from the scope of the invention, as defined in the appended claims.

The embodiments of the invention in which an exclusive property or privilege is claimed are defined as follows:

1. An insert for use in the shell of a ball and seat valve finding application in a reciprocating downhole pump, comprising:
    a cylindrical tubular body forming a through-bore and having vertically spaced apart top and bottom rings joined by circumferentially spaced apart ribs, the rings and ribs combining to form side openings;
    the ribs supporting inwardly protruding flanges having upper inner ends arching together toward the longitudinal axis of the body, the flanges each thinning upwardly and inwardly and having curved bottom surfaces; and
    an upwardly directed, elongate reinforcing member connected with the flanges at their upper inner ends, the reinforcing member and flanges protruding above the top ring;
    the curved bottom surfaces of the flanges and the reinforcing member combining to form a semi-spherical ball stop located beneath an upper edge of the top ring.

2. The insert as set forth in claim 1 wherein:
    the ribs are inclined and shaped to form helically configured side openings; and
    the flanges are helically directed.

3. The insert as set forth in claim 2 wherein:
    the flanges correspond at their bases with the shaping of the ribs.

4. The insert as set forth in claim 3 wherein there are three ribs supporting three flanges.

5. The insert as set forth in claim 2 wherein there are three ribs supporting three flanges.

6. The insert as set forth in claim 1 wherein:
    the flanges each thin upwardly and inwardly along their inner ends.

7. The insert as set forth in claim 6 wherein there are three ribs supporting three flanges.

8. The insert as set forth in claim 1 wherein there are three ribs supporting three flanges.

* * * * *